United States Patent Office 3,391,133
Patented July 2, 1968

3,391,133
METHACRYLATE ESTERS OF TROPOLONES
Lorraine Guy Donaruma, Potsdam, N.Y., assignor to Research Corporation, New York, N.Y., a nonprofit corporation of New York
No Drawing. Filed Aug. 2, 1965, Ser. No. 476,731
5 Claims. (Cl. 260—192)

ABSTRACT OF THE DISCLOSURE 2-methacryloxytropones are prepared by reacting the sodium salt of the corresponding tropolone with methacrylyl chloride, and are useful as antibacterials.

---

This invention relates to tropolone compounds. In one specific aspect, it relates to methacrylate esters of tropolones and to methods for making such esters.

The seven-membered ring compound 2,4,6-cycloheptatrien-2-ol-1-one, better known as tropolone, is representative of a class of compounds known as the tropolones. These compounds exhibit quasi-aromatic activity and undergo nuclear substitution in a manner somewhat analogous to phenol. Thus, the tropolone nucleus can be chlorinated, brominated, nitrated, sulfonated, formylated, nitrosated and diazo-coupled, usually in the gamma or 5-position. Conventional conversions yield the corresponding iodo, amino, hydrazino, acylamino, mercapto, hydroxy, alkoxy, cyano and carboxylic acid derivatives.

While the carbonyl group of tropolone compounds resists normal ketone reactions, the hydroxyl group undergoes acylation and can be esterified.

It is an object of the present invention to provide a new class of tropolone esters useful as anti-bacterials and for other purposes.

The present invention is the class of compounds which may be characterized as 2-methacryloxytropones or the methacrylate esters of tropolone. A preferred group within the class is the methacrylate esters of 5-substituted tropolone compounds. These preferred esters may be represented as having the general formula:

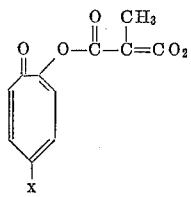

wherein $x$ represents a ring substituent such as those described above. Thus $x$ may be, but is not limited to, hydrogen, chloro, bromo, iodo, nitro, nitroso, sulfonic acid, carboxylic acid, amino, acylamino, diazo, hydrazino, formyl, cyano, mercapto, alkylmercapto, hydroxyl, alkoxy, et cetera.

The methacrylate esters of the present invention are most conveniently prepared by the reaction of a methacrylyl halide such as methacrylyl chloride with the corresponding tropolone compound as its sodium or potassium salt. Preferably, the acylation is effected under anhydrous conditions and in the presence of a solvent. Pyridine is particularly suitable for use as the solvent or in conjunction with an aromatic hydrocarbon solvent.

Acylation under such conditions results in the esterification of both tropolone and substituted tropolones of the type described above. The presence of a substituent at the 5-position of the tropolone reactant does not interfere with acylation of the enolic hydroxyl group present at the 2-position. Moreover, esterification of the 2-hydroxyl group is not prevented by the presence at the 5-position of a group capable of reaction with the methacrylyl halide. Under such circumstances, acylation occurs at both the 2- and the 5-positions.

My invention is further illustrated by the following examples for making representative compounds according to the present invention.

Example 1

To a three necked flask equipped with a stirrer and a condenser was added 10 grams (0.083 mole) of tropolone, 0.10 gram of hydroquinone, 14.0 grams of dry pyridine, and 150 milliliters of dry benzene. The air in the flask was replaced by nitrogen and 8.52 grams (0.083 mole) of methacrylyl chloride was added dropwise with vigorous stirring. Stirring was continued for one hour after the addition of methacrylyl chloride was complete. The reaction mixture was washed successively with water, dilute hydrochloric acid, water, and finally dried over anhydrous calcium chloride. The benzene was evaporated off leaving a white solid. Recrystallization from hexane gave 12.4 grams or a 65% yield of 2-methacryloxytropone as white needles, M.P. 78–79° C.

Analysis.—($C_{11}H_{10}O_3$) calculated: C, 69.49; H, 5.29. Found: C, 69.71; H, 5.16.

Example 2

(A) To a three necked flask equipped with a stirrer and a condenser there was added 7.0 grams (0.051 mole) of 5-aminotropolone dissolved in 50 milliliters of dry pyridine. A slight molar excess of benzoyl chloride was added dropwise with stirring and the stirring continued for one hour after the addition was complete. The reaction mixture was poured into 200 milliliters of water. A brown oil settled out which solidified after fifteen minutes. Recrystallization from ethanol gave 6.6 grams of N-benzoyl-5-aminotropolone as yellow plates with a M.P. of 207–10° C.

Analysis.—($C_{14}H_{11}O_3N$) calculated: C, 71.05; H, 4.88. C, 69.80. Found: H, 4.56.

(B) The sodium salt of N-benzoyl-5-aminotropolone was prepared by dissolving N-benzoyl-5-aminotropolone in ethanol and adding an equimolar amount of sodium methylate. A bright yellow precipitate of the sodium salt resulted.

(C) To a three necked flask equipped with a stirrer and a condenser, there was added 7.0 grams (0.03 mole) of the sodium salt of N-benzoyl-5-aminotropolone of hydroquinone, and 50 milliliters of dry pyridine. At room temperature and in a nitrogen atmosphere, 3.2 grams (0.03 mole) of methacrylyl chloride was added dropwise with stirring. After stirring for one additional hour, the reaction mixture was added to 200 milliliters of water causing the separation of a brown oil which solidified in about 15–30 minutes. Recrystallization of the solid from an ethanol-water mixture gave 2.3 grams or a 25% yield of 2-methacryloxy-N-benzoyl-5-aminotropone as a yellow powder with a M.P. of 183–85° C.

Analysis.—($C_1H_{15}O_4N$) calculated: C, 69.89; H, 4.89. Found: C, 69.69; H, 4.70.

Example 3

(A) Concentrated hydrochloric acid (5.2 milliliters) was added to amixture of 5.0 grams (0.04 mole) of tropolone, 180 milliliters of a 0.25 M phosphate buffer (pH 6.9), 4.28 grams of p-toluidine and 15 grams of crushed ice. Over a fifteen minute period, 50 milliliters of an aqueous solution containing 3.6 grams of sodium nitrite was then added. Stirring was continued for an additional thirty minutes and the resultant solid product collected by filtration. Recrystallization from ethanol-water gave 7.2 grams or a 75% yield of 5-p-tolylazotropolone as red needles with a M.P. of 200–02° C.

(B) The sodium salt of 5-p-tolylazotropolone was prepared by dissolving the crude azo-derivative in ethanol and adding an equimolar amount of sodium methylate. A bright red precipitate formed on addition of the sodium methylate.

(C) In a three necked flask equipped with a mechanical stirrer and a condenser was placed 10 grams (0.038 mole) of the sodium salt of 5-p-tolylazotropolone, 6.0 grams of dry pyridine, 0.10 gram of hydroquinone, and 150 milliliters of dry benzene. An equimolar amount of methacrylyl chloride (3.9 grams) was added dropwise with vigorous stirring. After one hour, the reaction mixture was washed successively with water, dilute hydrochloric acid, water, and finally dried over anhydrous calcium chloride. The benzene was evaporated off leaving 6.0 grams or a 51% yield of crude product. Recrystallization from ethanol-water gave red-orange needles of 2-methacryloxy- 5-p-tolylazotropone melting 168–69° C.

Analysis.—($C_{14}H_{12}O_2N_2$) calculated: C, 70.11; H, 5.23. Found: C, 10.35; H, 5.27.

Example 4

(A) To 5.0 grams (0.04 mole) of tropolone dissolved in 120 milliliters of a 0.25 M phosphate buffer (pH 6.9) was added 3.8 grams (0.04 mole) of aniline, 10.0 grams of crushed ice, and 4.2 milliliters of concentrated hydrochloric acid. With vigorous stirring, an aqueous solution of sodium nitrite (2.8 grams in 25 milliliters of water) was added over a fifteen minute period. The resultant orange precipitate, after standing fifteen minutes, was collected by filtration to yield 7.4 grams of crude product. Recrystallization from ethanol gave bright orange needles of 5-phenylazotropolone melting 163–64° C.

Analysis.—($C_{13}H_{10}O_2N_2$) calculated: C, 69.01; H, 4.46. Found: C, 68.62; H, 4.37.

(B) The 5-phenylazotropolone coupling product was dissolved in ethanol by heating and an equimolar amount of sodium methylate was added. The sodium salt of 5-phenylazotropolone precipitated as a red-orange solid.

(C) Eight grams (0.032 mole) of the sodium salt of 5-phenylazotropolone, 0.10 gram of hydroquinone, and 5.0 grams of dry pyridine were added to 150 milliliters of dry benzene. An equimolar amount of methacrylyl chloride (3.3 grams) was added dropwise with vigorous stirring. After one hour, the reaction mixture was washed successively with water, dilute hydrochloric acid, water, and finally dried over anhydrous calcium chloride. The benzene was evaporated off leaving 5.2 grams of a 55% yield of crude product. Recrystallization from ethanol-water gave 2-methacryloxy-5-phenylazotropone as orange plates with a M.P. of 135–37° C.

Analysis.—($C_{17}H_{14}O_3N_2$) calculated: C, 69.37; H, 4.79. Found: C, 69.49; H, 5.04.

It has been established by screening representative compositions against various test organisms that the compositions of the present invention exhibit anti-bacterial activity. It will be appreciated that these compositions, depending on the nature of the substituents present, will differ in their anti-bacterial effects and degree of activity against various microorganisms. For example, certain compositions are more effective against gram positive bacteria than against gram negative bacteria whereas other compositions exhibit a broader anti-bacterial spectrum.

In the following experiment, the undiluted test composition was screened against five bacteria by the agar plate technique of U.S.D.A. Circular No. 198 (1931). In each case the width of the zone of inhibition was measured. In the table below, the results of tests giving zones of inhibition below 10 millimeters are classified as weak, between 10 and 20 millimeters as strong and over 20 millimeters as very strong.

| Test Culture | 2-methacryloxy-5-p-tolylazotropone | 2-methacryloxy-tropone |
|---|---|---|
| Straphylococcus aureus | Weak | Strong. |
| Salmonella typhosa | | Very strong. |
| Salmonella choleraesuis | | Strong. |
| Escherichia coli | | Do. |
| Streptococcus pyogenes | Weak | Do. |

In addition to their anti-bacterial activity, many of the compositions of the present invention exhibit anti-neoplastic activity in standard tissue culture screening tests. Representative results obtained in such screening experiments are summarized below:

| Test compound | ED$_{50}$ | Slope |
|---|---|---|
| 2-methacryloxy-tropone | 4.7 | −0.53 |
| 2-methacryloxy-5-phenylazotropone | 1.7 | −0.64 |
| 2-methacryloxy-5-p-tolylazotropone | 3.3 | −0.85 |

NOTE.—The ED$_{50}$ is given in micrograms per milliliter.

The compositions of the present invention are useful as intermediates in the preparation of other desirable compositions. By virtue of conjugated unsaturation present in the methacrylate portion of the molecule, the compositions may undergo copolymerization or homopolymerization. The techniques applied to copolymerize or homopolymerize these compositions are those employed with the more conventional methyl and ethyl methacrylate esters. Hydroquinone is added in the preparative examples described herein to inhibit homopolymerization of the compositions of the present invention.

I claim:

1. Compounds of the formula

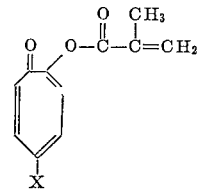

wherein $x$ is hydrogen, benzamido, phenylazo or p-tolylazo.

2. 2-methacryloxytropone.
3. 2-methacryloxy-N-benzoyl-5-aminotropone.
4. 2-methacryloxy-5-phenylazotropone.
5. 2-methacryloxy-5-p-tolylazotropone.

References Cited

UNITED STATES PATENTS

| 2,554,947 | 5/1951 | Joos | 260—486 |
| 2,929,806 | 3/1960 | Marvel et al. | 260—486 XR |
| 2,945,843 | 7/1960 | Armen et al. | 260—486 XR |
| 3,055,932 | 9/1962 | Verbanic et al. | 260—486 |
| 3,177,185 | 4/1965 | Hollander et al. | 260—486 XR |
| 3,183,219 | 5/1965 | Schuler | 260—486 XR |
| 3,254,115 | 5/1966 | Cohen et al. | 260—486 |

OTHER REFERENCES

Cornel et al., C.A., vol. 63, p. 2924, (1965).
Kitahara et al., C.A., vol. 46, pp. 7560–7561 (1952).
Nozoe et al., C.A. vol. 45, p. 7098h (1951).

FLOYD D. HIGEL, Primary Examiner.